(12) United States Patent
Farley

(10) Patent No.: US 7,090,283 B2
(45) Date of Patent: Aug. 15, 2006

(54) COSMETIC-PLASTIC WINDOW COVERING FOR AUTOMOBILE

(76) Inventor: Drake Farley, 2977 Fort Baker Dr., SE., Washington, DC (US) 20020

( * ) Notice: Subject to any disclaimer, the term of this patent is extended or adjusted under 35 U.S.C. 154(b) by 115 days.

(21) Appl. No.: 10/666,933

(22) Filed: Sep. 16, 2002

(65) Prior Publication Data
US 2004/0058104 A1     Mar. 25, 2004

(51) Int. Cl.
B60J 1/20 (2006.01)

(52) U.S. Cl. .............. 296/146.2; 160/370.23; 160/DIG. 2

(58) Field of Classification Search ............ 296/146.1, 296/146.2, 97.1, 97.2, 97.7, 97.8; 160/370.23, 160/DIG. 2, DIG. 3
See application file for complete search history.

(56) References Cited

U.S. PATENT DOCUMENTS

| | | | | |
|---|---|---|---|---|
| 3,411,562 A | * | 11/1968 | Garrett | 296/95.1 |
| 3,923,339 A | * | 12/1975 | McDonald | 296/95.1 |
| 4,889,754 A | * | 12/1989 | Vargas | 296/95.1 |
| D370,650 S | * | 6/1996 | Eskandry | D12/191 |
| 5,692,554 A | * | 12/1997 | Huang | 160/370.23 |
| 6,063,477 A | * | 5/2000 | Ames et al. | 428/192 |
| 6,869,127 B1 | * | 3/2005 | Dohle | 296/146.1 |

* cited by examiner

Primary Examiner—Jason Morrow

(57) ABSTRACT

A very thin, flexible and light weight transparent plastic that replaces a broken side and/or rear window for temporary use or pleasure. This durable and clear plastic can keep cold air and rain out of the interior of the car, and when needed, it keeps heat and air conditioning inside of the vehicle. Its primary design is to prevent easy access to automobiles with broken or damaged windows. This strong, but durable transparent plastic covering fits snug and tight into the creases of the vehicle's window frame. A strong, clear adhesive is used to help support the plastic window covering, in order to keep it securely in place. The plastic window covering is also called a cosmetic window covering, because it can be used fashionably, as well as a necessity. The window covering can be used in various shades of tinted colors, for the purpose of fashion, privacy and style. The great things about this invention is that—once carefully crafted and designed to fit once side of the car's side door window frame—it can be used to fit the opposite side of the same car's window frame.

4 Claims, 5 Drawing Sheets

COSMETIC-PLASTIC WINDOW COVERING FOR AUTOMOBILE

This invention is a folding replacement window having a plurality of elongate panels which are joined together along their elongate sides. It is primarily useful as a replacement window for the damaged or destroyed side or rear windows of an automobile.

BACK GROUND OF INVENTION

While efforts have been made henceforth to provide an alternative to the high cost it takes to repair a broken side and/or rear automobile windows, this invention is intended to be very cost effective, for temporary use, stylish and fashionable. The idea was primarily to create something that would look more attractive and natural—than using a plastic trash bag, or like plastic material, or cardboard sections to cover-up a broken car window. To help make that last-minute, self-repair emergency effort solution, in order to cover a broken window to the car's side doors and window frames, less messy and masking tape free, and to make a vehicle less vulnerable to burglary and theft.

The related art in this invention includes, basically, the pertinent references cited by the examiner. For example, Eskandry, shows primarily a sunshade that blocks the rays of the sun. Then there is Garrett, who indicates in the prior art that even though it is a temporary windshield-it contains a series of parallel transfer aluminum reinforcing rods to support the plastic sheet that covers the opening of the windshield frame. Then there is Ames, inventor of the plastic replacement windows for automobile, whose apparatus covers the entire door frame around the opening of a broken window. Then there is Vargas, inventor of the temporary window, this material consist of two superimposed layers of flexible transparent polymeric film adapted to cover and extend beyond the opening of the window. Then there is McDonald, whose invention does not serve the same purpose that the cosmetic-plastic window covering for automobile serves.

BRIEF SUMMARY OF THE INVENTION

The cosmetic-plastic window covering for automobile is designed to give the appearance of an original side, or in some cases, a rear automobile window that has been broken-out or can no longer raise up from inside the door panel. It is transparent—similar to an original automobile side door or rear window and it has an added feature that makes it a more practical item to use instead of immediately buying a new window. The cosmetic-plastic window covering for automobile is made from a durable transparent plastic sheet of material, shaped and trimmed to fit the side-door window frame and on some cars, it can replace a rear window as well. It is lightweight and foldable—like an accordion and it is easy to install. The durable transparent plastic sheet is separated into six or more equally measured sections, depending on the length of the car's side-door frame and shape. Thus, the plastic sheets of material are bonded together on opposite sides of each section using a 2-inch wide heavy-duty transparent adhesive tape, which allows for the cosmetic-Plastic window covering to be the most practical solution to temporarily dealing with burden of repairing or replacing a side-door or rear window.

BRIEF DESCRIPTION OF THE SEVERAL VIEWS OF THE DRAWING

The invention for which I would like to give a detailed description of will be more completely understood by reference to the explanation hereto when read in connection with the attached drawings, and wherein.

DETAILED DESCRIPTION OF THE INVENTION

Figure 1:
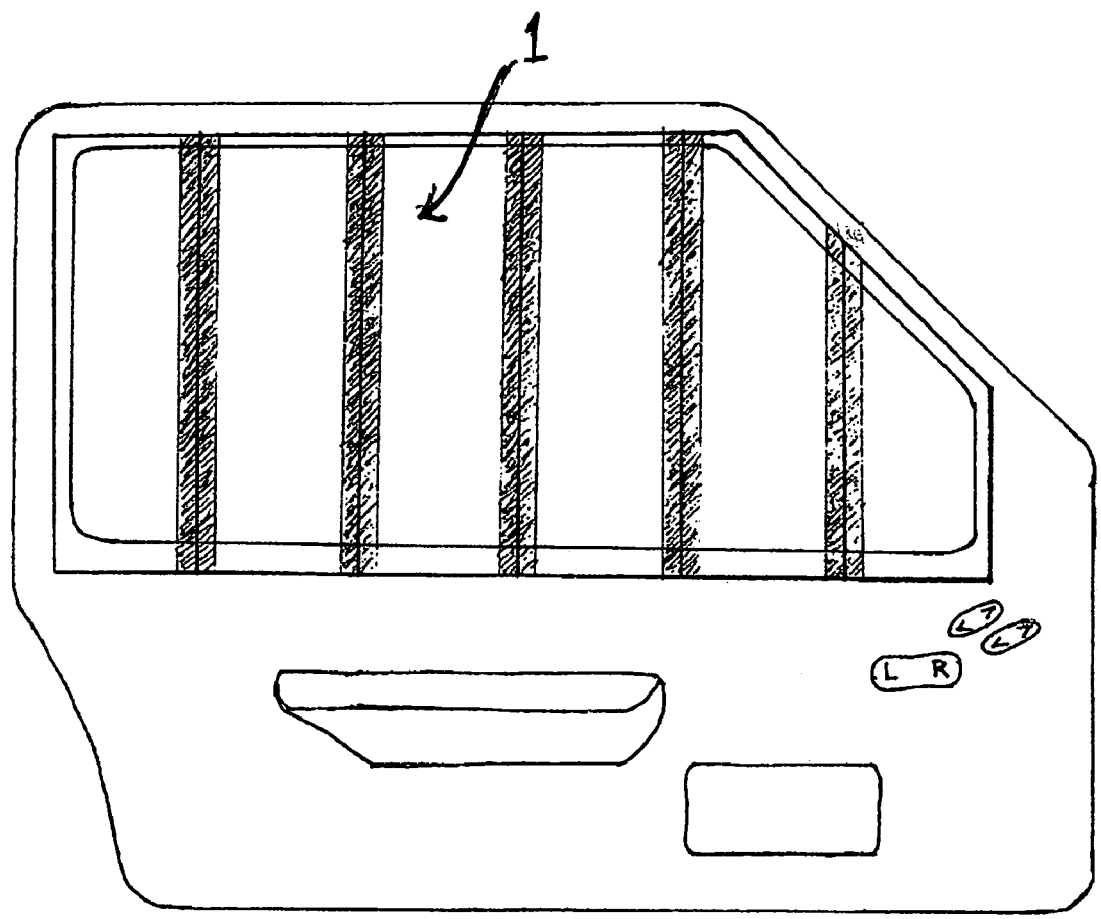
FIG. 1 is a side view of a vehicle's side-door and panel with a sample of the invention installed.
Figure 2:
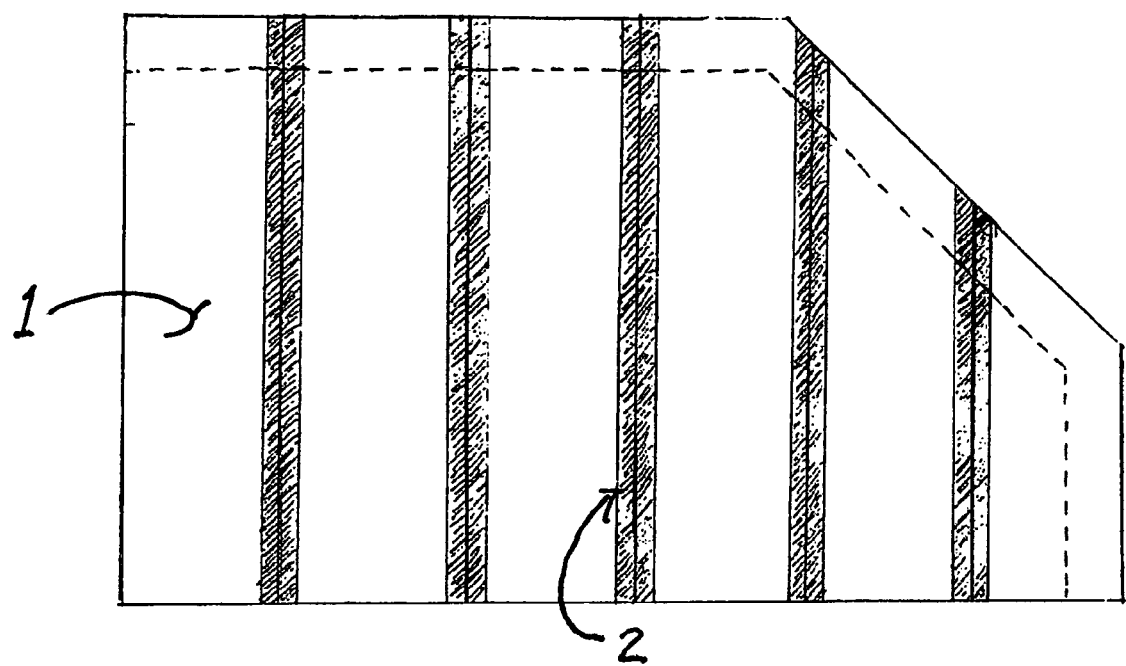
FIG. 2 is an enlarged sample of the fully extended invention uninstalled showing the shaded image of the 2 inch-wide transparent adhesive tape that binds the parts of the transparent plastic together, in order to make it durable and hard to rip, crack or brake apart.
Figure 3:
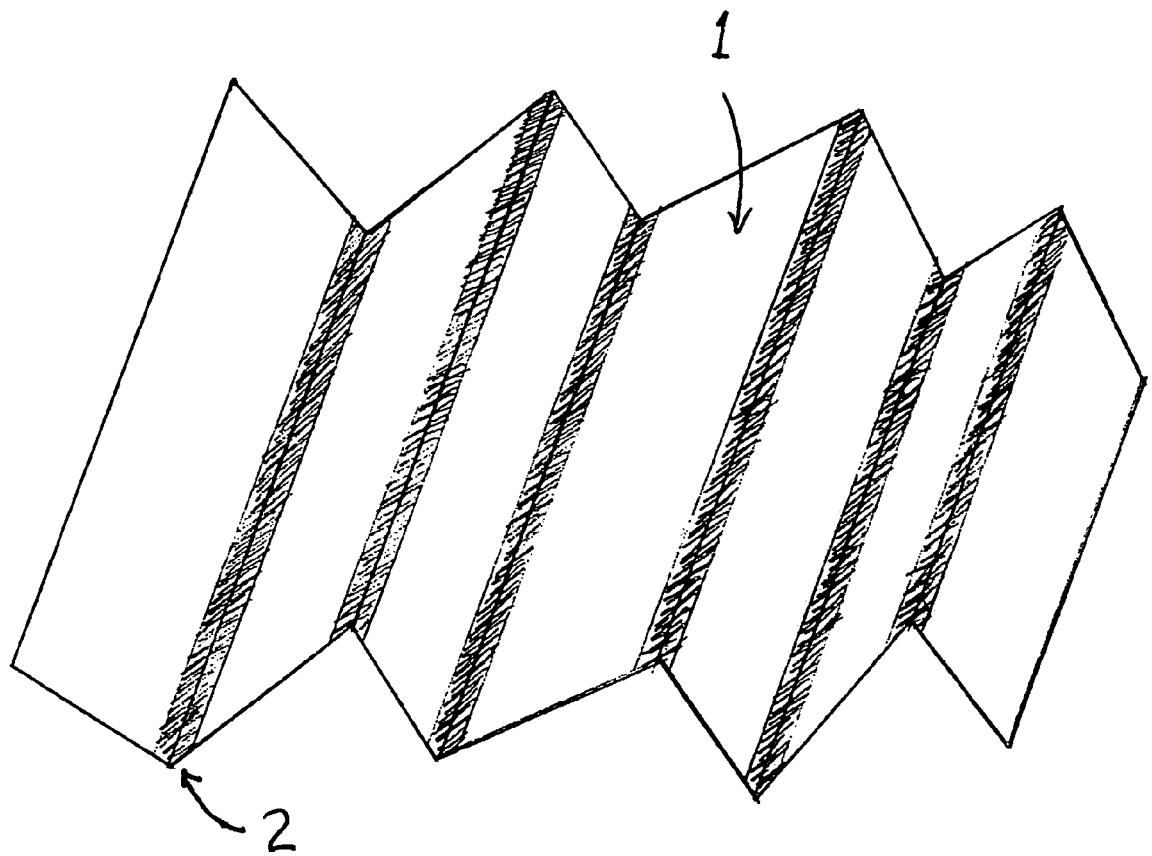
FIG. 3 is a view of the way in which the cosmetic-plastic window covering for automobile is made and designed, to show how it can be folded.
Figure 4:
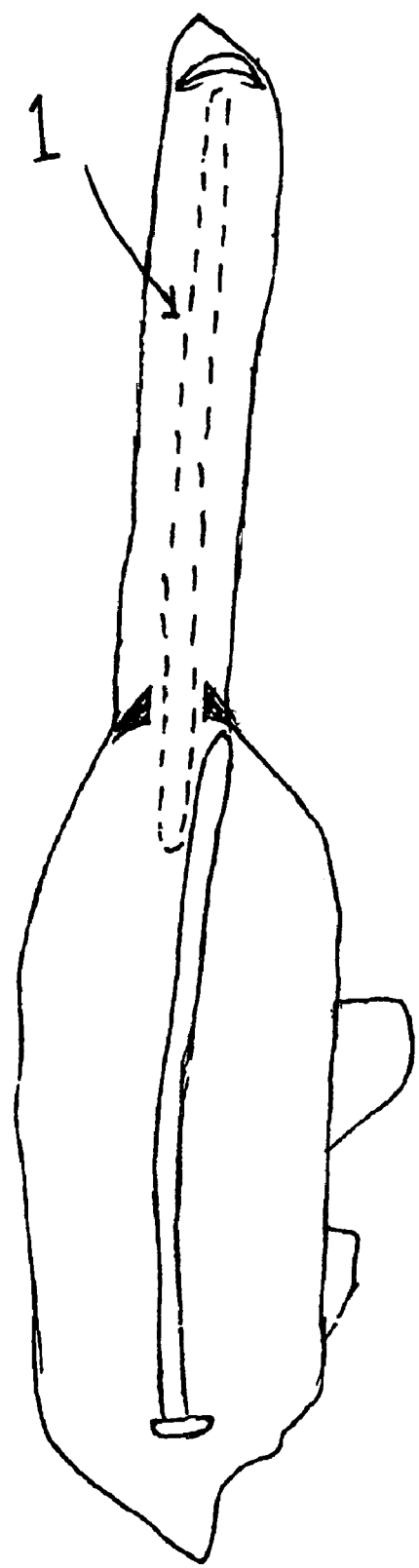
FIG. 4 is a view of a vehicle's side-door frame showing the position and setting of the invention between the door panel and window frame.
Figure 5:
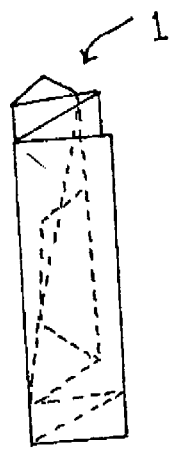
FIG. 5 is an end view of the cosmetic-plastic window covering for automobile—showing how the replacement window can be folded away for storage.
Figure 6:
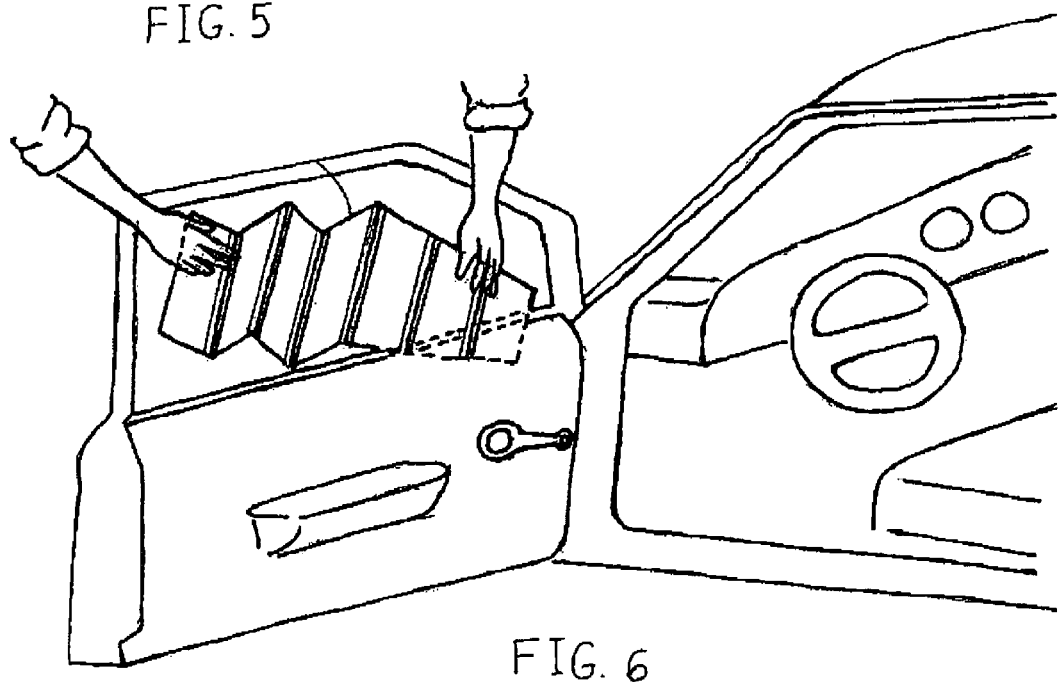
FIG. 6 is a view of an automobile's front driver-side door frame—showing a depiction of the cosmetic-plastic window covering for automobile being manually installed.

Reference is now made to the drawing figures showing the practicality and convenience of a using a temporary cosmetic-plastic replacement window, shown in FIG. 1. The window covering is made up of a durable, transparent and impact-resistant plastic, shown in FIG. 1, showing the shape and how it is inserted into the door frame of the automobile. Actually, the cosmetic-plastic window covering for automobile is designed, cut and shaped to fit firmly and securely in the side-door window frame of the car. The impact-resistant plastic, or like plastic material has a thickness or a width equal to a standard size manufactured automobile window. The rear view, in FIG. 4, gives a depiction of how thick cosmetic-plastic window covering for automobile must be, in compared to a manufactured automobile window, in order to fit snug and secure in the car's door frame. The standard car door window's shape and size and dimensions are ideal for a perfect fit for my cosmetic-plastic window covering.

Therefore, to make the cosmetic-plastic window covering fit the front side-door window frame, I have designed and constructed a substitute that will consist of combining a minimum of six (6) sets, panel 1 in FIG. 1 through 3, 5 and 6, of a durable, impact-resistant transparent plastic material sheets. The six (6) or more plastic sheets of material, panel 1 in FIG. 1 through 3, 5 and 6, will be connected together, with the use of an extra strength transparent two-inch wide tape, 2 in FIG. 1 through 3, 5 and 6. Once each plastic set of material is bond together, by the transparent tape, on each opposite sides, it will form the size and shape of a standard size automobile's front side-door window frame.

The idea of creating this cosmetic-plastic window covering was to make a product that could be used temporarily on an automobile and it could be reusable, lightweight and easy to fold and stored away—until someone chooses to use it again. The minimum of six (6) sets, panel 1 in FIGS. 1 through 3 and 5 and 6 of plastic sheets material. Even though the primary aim, in creating the transparent, cosmetic-plastic replacement window covering for automobile, was to make something that could replace the broken window or malfunctioned window, normally found on either side of the front side-door window frames—my design can work on all other automobile's side door window frames, and some car's rear window frame.

I claim:

1. A temporary replacement window for an existing broken automobile door window, the automobile including at least one door window frame having a molding for receiving an existing door window therein, the temporary replacement window comprising:

a sheet constructed of an impact-resistant plastic having a plurality of foldable sections, each of the sections having edges, the edges of adjacent sections being connected together by 2-inch wide transparent adhesive tape such that vision through the temporary replacement window is completely clear and transparent so as to allow unobstructed vision therethrough, the sheet being foldable along the edges of the sections from a substantially planar configuration to a compact stored configuration in which the sections are folded upon each other;

wherein the sheet, in its substantially planar configuration, is sized and shaped to fit snugly and tightly into the automobile's window frame and molding and fill the space originally occupied by the existing automobile door window, wherein the sheet is of a thickness and overall outer dimension such that it is tightly held by friction with the door molding in the space originally occupied by the existing automobile door window and requires no other fastening mechanism to hold it in place.

2. The temporary replacement window of claim 1, wherein the at least one door window frame is a front door window frame.

3. The temporary replacement window of claim 1, wherein the impact-resistant sheet is tinted a color for the purpose of personalizing the temporary replacement window.

4. The temporary replacement window of claim 1, wherein the temporary replacement window is designed to be used with a variety of automobiles.

* * * * *